C. W. HARMAN & H. G. SKIDMORE.

WATCH CASE.

No. 10,556. Reissued Feb. 3, 1885.

Attest
Carl Spengel
Geo. L. Wheelock.

Inventors
C. Wesley Harman
Horace G. Skidmore
By Knight Bros. Att'ys.

UNITED STATES PATENT OFFICE.

C. WESLEY HARMAN AND HORACE G. SKIDMORE, OF CINCINNATI, OHIO.

WATCH-CASE.

SPECIFICATION forming part of Reissued Letters Patent No. 10,556, dated February 3, 1885.

Original No. 293,869, dated February 19, 1884. Application for reissue filed April 12, 1884.

*To all whom it may concern:*

Be it known that we, C. WESLEY HARMAN and HORACE G. SKIDMORE, both of Cincinnati, Hamilton county, Ohio, have invented a new and useful Improvement in Watch-Movement Boxes, of which the following is a specification.

Our invention relates to an inclosing box or shell for watch-movements, so constructed as to be completely and permanently dust and moisture proof, and to constitute from and after completion of the movement a protecting-envelope thereto for storage or shipment, and, finally, as a constituent part of the completed watch, whose mechanism thus becomes hermetically sealed, irrespective of any dust-proof qualities of the external case, and whether such case be, in fact, dust-proof or not.

Figure 1:
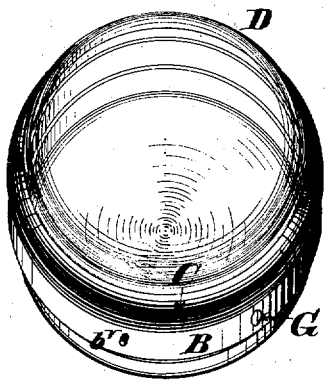
Figure 2:
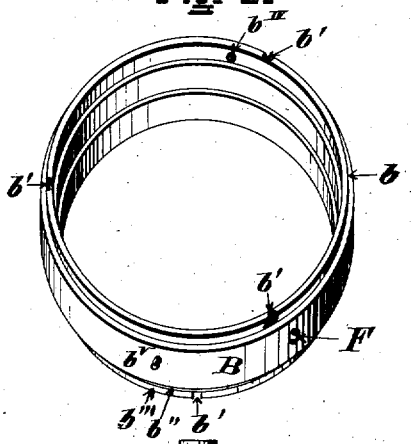
Figure 3:
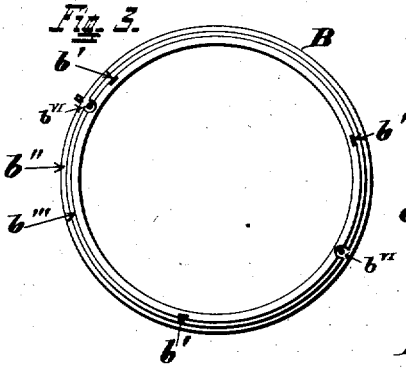
Figure 4:
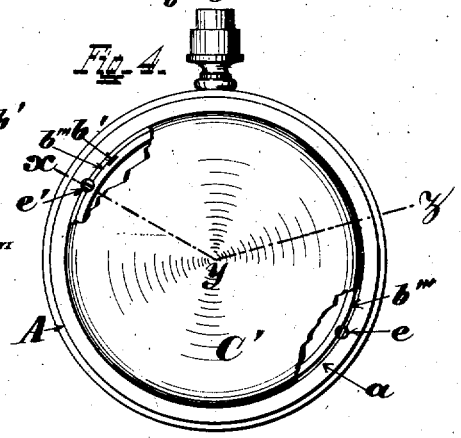
Figure 4:
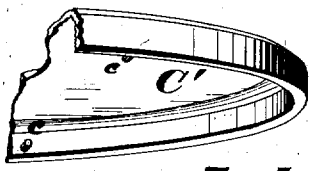
Figure 6:
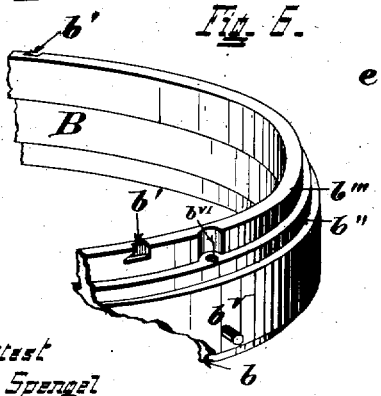
Figure 7:
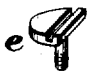
Figure 5:
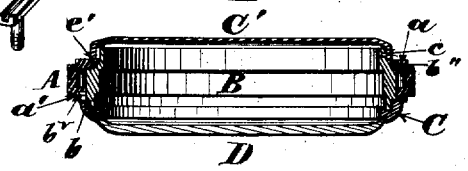

In the accompanying drawings, Figure 1 is a perspective view of our movement-box viewed on its front side. Fig. 2 is a perspective view of the same without the front cover. Fig. 3 is a profile of the ring or body taken on its rear side. Fig. 4 is a rear view of the box in place within a watch-case, portions of the rear cover being broken away to expose a pair of fastening-screws, of which one is shown in the effective or locking position. Fig. 5 is a section on the line *x y z* of Fig. 4. Fig. 6 is an enlarged perspective view of our movement-box viewed from the rear side, the cover being removed to show the fastenings which connect the ring and cover. Fig. 7 is an enlarged representation of one of the locking-screws.

A may represent the central rim ("center") of the external watch-case, of any customary or suitable style or pattern.

B is an annular piece of metal that constitutes the body of our movement box or shell. That margin of said body which in use corresponds to the dial or front face of the movement has a step or rabbet, *b*, spiral grooves *b'* in which receive studs *c*, that project from the metallic portion ("bezel") C of the front cover, C D, of the said box, in which D represents the glass or crystal. The action of said studs in said grooves is such that a short turn to the right of said cover closes it down hermetically upon said body. The rear edge of said body has a rabbet, *b''*, which, fitting against lip *a* of the watch-case proper, serves to support the movement-box in the said case, and has concentrically within said rabbet another rabbet, *b'''*, spiral grooves *b'* in which receive studs *c*, that, projecting inwardly from the rear cover, C', enable its attachment to the body in the same manner as that described for the front cover. A small hole, $b^{iv}$, in the inner wall of the body, near its front edge, receives the customary projection from the movement-frame to prevent any circumferential shift thereof. For a like purpose the movement-box has an external projection or stud, $b^{v}$, to occupy the notch *a'* (see Fig. 5) in the external case, which, in the customary form of watches, receives the aforesaid projection from the movement. To prevent the thus inserted movement-box dropping out through the front of the watch-case, we tap into the body B, by means of threaded holes $b^{vi}$, two half-head screws, *e e'*, which, when placed in the position that *e* is shown in, permit the insertion into the watch-case of the movement-box, and which, when placed in the position that *e'* is shown in, serve to lock said box securely to the case.

Such of our boxes as are intended for stem-winders may have a circular orifice, F, closed temporarily by a plug, G. Through this orifice (after removal of the plug) the winder-stem is inserted. A similar orifice may be provided in the rear cover, C', for the key-pipe in key-winding movements; but we prefer to leave this perforation for the jeweler to make when applying the movement-box to its permanent case. The construction will be seen to be such as to permit removal of either cover C D or C' and of the movement itself without removing the body B from its place in the watch-case.

The above-described preferred form of our invention may be varied in some of its details. For example, either or both covers may be attached to the body by screw-threads. A glazed bezel, like C D, may be substituted for the all-metal cover C'. The shoulder which supports the movement-box within the case proper may be located near the front instead of at the rear of said case. Lastly, the rear cover only may be secured in the manner described, the bezel (which is comparatively seldom disturbed, and where absolute tightness is of less importance) being secured by ordinary snap.

We claim as new and of our invention—

1. A movement-holding ring for watches adapted to be held from movement in the case-center, and which has one of its covers secured to the ring-body by being turned onto it as by a screw or bayonet-joint connection, so that access can be had to the movement without removing it from the case-center, said ring being adapted for use as a movement-holding box, as set forth.

2. A movement-holding ring for watches adapted to be held from movement in the case-center, and whose back is secured to the ring-body by being turned onto it as by a screw or bayonet-joint connection, so that access can be had to the movement without removing it from the case-center, said ring being adapted for use as a movement-holding box, as set forth.

3. The watch-movement box or receptacle in three parts consisting of annular body B, having rabbets $b$ $b''$ $b'''$, the spiral grooves $b'$, the hole $b^{iv}$, and the stud $b^{v}$, in combination with the separately-attached covers C D and C′, having inwardly-extending studs $c$, as and for the purpose set forth.

4. The combination of a watch-case center, A, having recess $a'$ and lip $a$, a movement-box or receptacle in three pieces consisting of annular body B, having rabbets $b$ $b''$ $b'''$, the spiral grooves $b'$, the hole $b^{iv}$, and the stud $b^{v}$, and the covers C D and C′ turned thereon independently of the case-center, having studs $c$, to engage in the spiral grooves, as set forth.

In testimony of which invention we hereunto set our hands.

C. WESLEY HARMAN.
HORACE G. SKIDMORE.

Witnesses:
GEO. H. KNIGHT,
SAML. S. CARPENTER.